(12) United States Patent
Bowers et al.

(10) Patent No.: US 6,189,916 B1
(45) Date of Patent: Feb. 20, 2001

(54) AIR BAG MODULE WITH DEPLOYMENT DOOR

(75) Inventors: Paul A. Bowers, Ray; Daniel R. Sutherland, East Pointe, both of MI (US)

(73) Assignee: TRW Vehicle Safety Systems Inc., Lyndhurst, OH (US)

(*) Notice: Under 35 U.S.C. 154(b), the term of this patent shall be extended for 0 days.

(21) Appl. No.: 09/211,194

(22) Filed: Dec. 15, 1998

(51) Int. Cl.[7] ................................................. B60R 21/20
(52) U.S. Cl. .................................. 280/728.3; 280/728.2; 280/730.2; 280/732
(58) Field of Search ........................... 280/730.2, 730.1, 280/728.2, 728.3, 732

(56) References Cited

U.S. PATENT DOCUMENTS

| | | | |
|---|---|---|---|
| 5,062,664 | * 11/1991 | Bishop et al. . | |
| 5,308,111 | 5/1994 | Sommer . | |
| 5,398,959 | 3/1995 | Avila . | |
| 5,431,433 | 7/1995 | Steimke et al. . | |
| 5,542,691 | * 8/1996 | Marjanski et al. ................. | 280/730.2 |
| 5,547,214 | 8/1996 | Zimmermann, II et al. . | |
| 5,553,887 | 9/1996 | Karlow et al. . | |
| 5,601,332 | 2/1997 | Schultz et al. . | |
| 5,645,295 | 7/1997 | White, Jr. et al. . | |
| 5,669,627 | * 9/1997 | Marjanski et al. ................. | 280/730.2 |
| 5,813,693 | * 9/1998 | Gordon et al. .................... | 280/728.3 |

* cited by examiner

*Primary Examiner*—Eric Culbreth
(74) *Attorney, Agent, or Firm*—Tarolli, Sundheim, Covell, Tummino & Szabo L.L.P.

(57) ABSTRACT

A vehicle occupant safety apparatus (10) for mounting in a portion (20) of a vehicle includes a module (12). The module (12) includes an inflatable vehicle occupant protection device (30), an inflation fluid source (32), a cover (40) for the vehicle occupant protection device and the inflation fluid source, and bolts (38) for mounting the module in the vehicle portion. The module cover (40) encloses the inflation fluid source (32) and the protection device (30) when the protection device is in a deflated condition. The module cover (40) is made from a material which is flexible and wrapped around the vehicle occupant protection device (30) and the inflation fluid source (32). The apparatus also includes a deployment door (14), and tabs (90) (104) for releasably mounting the deployment door on the vehicle portion (20) for movement relative to the vehicle portion upon inflation of the protection device (30). The apparatus (10) also includes a flexible tether (16) connecting the deployment door (14) with the module (12) for limiting movement of the deployment door away from the module beyond a predetermined distance upon inflation of the protection device (30).

8 Claims, 3 Drawing Sheets

AIR BAG MODULE WITH DEPLOYMENT DOOR

BACKGROUND OF THE INVENTION

1. Technical Field

The present invention relates to a vehicle safety apparatus and, in particular, to an air bag module including a deployment door for covering a deployment opening through which the air bag is inflatable.

2. Description of the Prior Art

Some known air bag modules include an air bag which surrounds an inflator to provide the module with a soft or flexible external surface. It is known to position this "soft pack" type of air bag module inside a reaction canister. A deployment door is mounted on the reaction canister to cover the air bag and the inflator. The assembly of the door and the reaction canister with the module inside is then mounted in the vehicle seat. The door preferably has a Class A exterior surface to match the seat covering material. Upon actuation of the inflator, the inflating air bag pushes open the deployment door. The reaction canister directs the flow of inflation fluid into the air bag.

If a diffuser is incorporated in the soft pack module, the need for a reaction canister for directing the flow of inflation fluid is eliminated. The reaction canister can not be eliminated, however, if it is used to support the deployment door.

SUMMARY OF THE INVENTION

The present invention is a vehicle occupant safety apparatus for mounting in a portion of a vehicle. The apparatus comprises a module including an inflatable vehicle occupant protection device, an inflation fluid source, a cover for the vehicle occupant protection device and the inflation fluid source, and means for mounting the module in the vehicle portion. The vehicle occupant protection device is inflatable from a deflated condition to an inflated condition to help protect an occupant of a vehicle. The inflation fluid source is actuatable to provide inflation fluid for inflating the protection device. The module cover encloses the inflation fluid source and the protection device when the protection device is in the deflated condition. The module cover is made from a material which is flexible and wrapped around the vehicle occupant protection device and the inflation fluid source. The safety apparatus also includes a deployment door, and means for releasably mounting the deployment door on the vehicle portion for movement relative to the vehicle portion upon inflation of the protection device. The apparatus also includes a flexible tether connecting the deployment door with the module for limiting movement of the deployment door away from the module beyond a predetermined distance upon inflation of the protection device.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS

The present invention relates to a vehicle occupant safety apparatus for mounting in a portion of a vehicle. In particular, the present invention relates to a safety apparatus including an air bag and a deployment door for covering a deployment opening through which the air bag is inflatable. As representative of the present invention, FIGS. 1–4 illustrate a vehicle safety apparatus 10.

Figure 1:
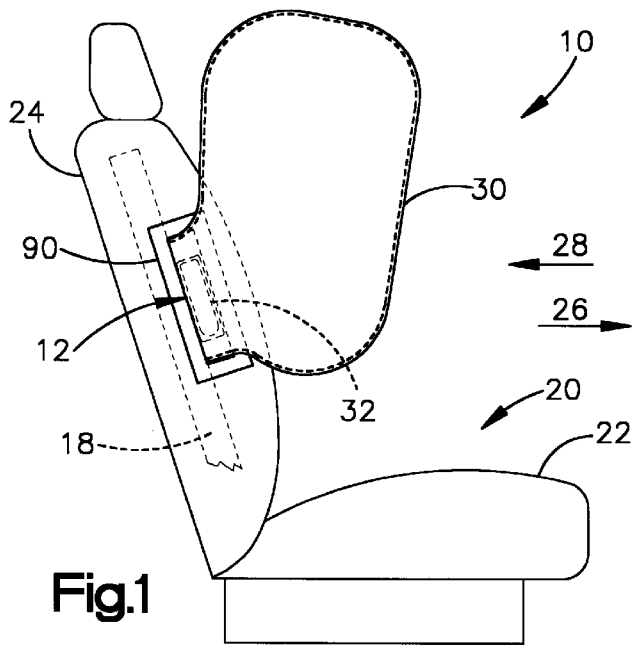
FIG. 1 is a schematic side elevational view of a vehicle seat and a vehicle safety apparatus constructed in accordance with a first embodiment of the present invention, showing an air bag in an inflated condition.
Figure 3:
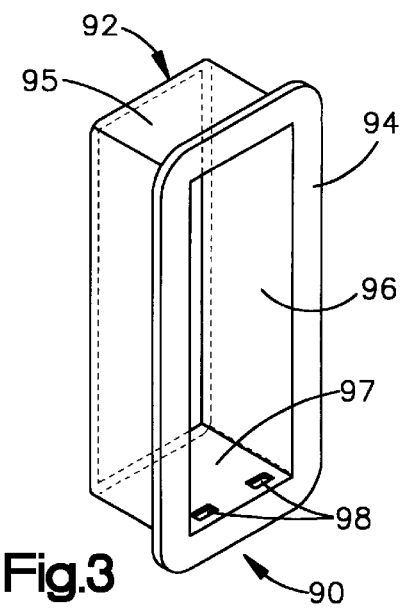
FIG. 3 is a perspective view of a chute which forms a part of the vehicle safety apparatus of FIG. 1.

The safety apparatus 10 includes an air bag module 12, a deployment door 14, and a tether 16 connecting the deployment door with the module (the door and tether are not shown in FIG. 1). The air bag module 12 is connected with a seat frame member 18 of a seat 20 for an occupant of a vehicle. The seat 20 includes a seat bottom cushion 22 and a seatback 24 connected with the seat bottom cushion. A forward direction in the vehicle is indicated by the arrow 26 (FIG. 1) and a rearward direction in the vehicle is indicated by the arrow 28.

The module 12 is of the type shown in U.S. Pat. No. 5,645,295, entitled Seat Mounted Air Bag Module. Specifically, the air bag module 12 includes a particular type of inflatable device, illustrated schematically at 30, which is commonly known as an air bag. The air bag 30 is preferably made from a fabric material, such as woven nylon. The air bag 30 can alternatively be made from a non-woven material, such as plastic film. The use of plastic film, in particular, would require one or more inflation fluid vents to be formed in the air bag 30, as is known in the art.

The air bag module 12 also includes an inflator assembly indicated schematically at 32 which includes an inflator in a diffuser. The inflator preferably contains a stored quantity of pressurized inflation fluid and an ignitable material for heating the inflation fluid. The module 12 alternatively could include an inflator which uses the combustion of gas-generating material to generate inflation fluid in the form of gas to inflate the air bag 30, or an inflator which contains only a stored quantity of pressurized inflation fluid for inflating the air bag.

A series of fluid outlets 34 (FIG. 2) are formed in the inflator assembly 32 for directing inflation fluid to flow from the inflator assembly into the air bag 30. The fluid outlets 34 are arranged in a straight line which extends parallel to an axis 36 of the module 12. A pair of mounting bolts 38 extend radially outward from the inflator assembly 32 opposite the fluid outlets 34.

The air bag module 12 includes a cover 40 (FIGS. 2 and 4) for enclosing the air bag 30 and the inflator assembly 32. The cover 40 is made from a material which is strong enough to protect the parts of the air bag module 12 which are enclosed within the cover. The material of the cover 40 is, preferably, soft enough, that is, sufficiently flexible or deformable, that the cover is not perceived by an occupant of the seat 20 as being a hard or rigid object in the seatback 24. A preferred material for the cover 40 is DuPont Hytrel DYM 100 brand thermoplastic polyester elastomer, having a material thickness of about 2 mm. This preferred material is available from E. I. DuPont de Nemours & Co. of Wilmington, Del.

The cover 40 has a clam-shell configuration (best seen in FIG. 4) including a first part 42 and a second part 44 which are generally similar in configuration. The two cover parts 42 and 44 are interconnected by a rupturable portion 46 of the cover 40. The rupturable portion 46 of the cover 40 serves as a hinge or flexible joint which enables relative pivotal movement between the two cover parts 42 and 44 during assembly of the air bag module.

The first cover part 42 includes a flange portion 50 having a pair of circular fastening openings 52. The second part 44 of the cover 40 includes a flange portion 54 having a pair of circular fastener openings 56. The flange portion 54 of the second cover part 44 has a flared cross-sectional configuration.

The rupturable portion 46 of the cover 40 forms a stress riser in the cover and releasably connects the first and second parts 42 and 44 of the cover. Specifically, the rupturable portion 46 of the cover 40 is a predetermined weakened portion of the cover which is rupturable under less force than is needed to rupture other, surrounding, portions of the cover. As a result, upon inflation of the air bag 30 as described below, the cover 40 opens, in a predetermined manner, at the rupturable portion 46 rather than at any other location.

Figure 2:
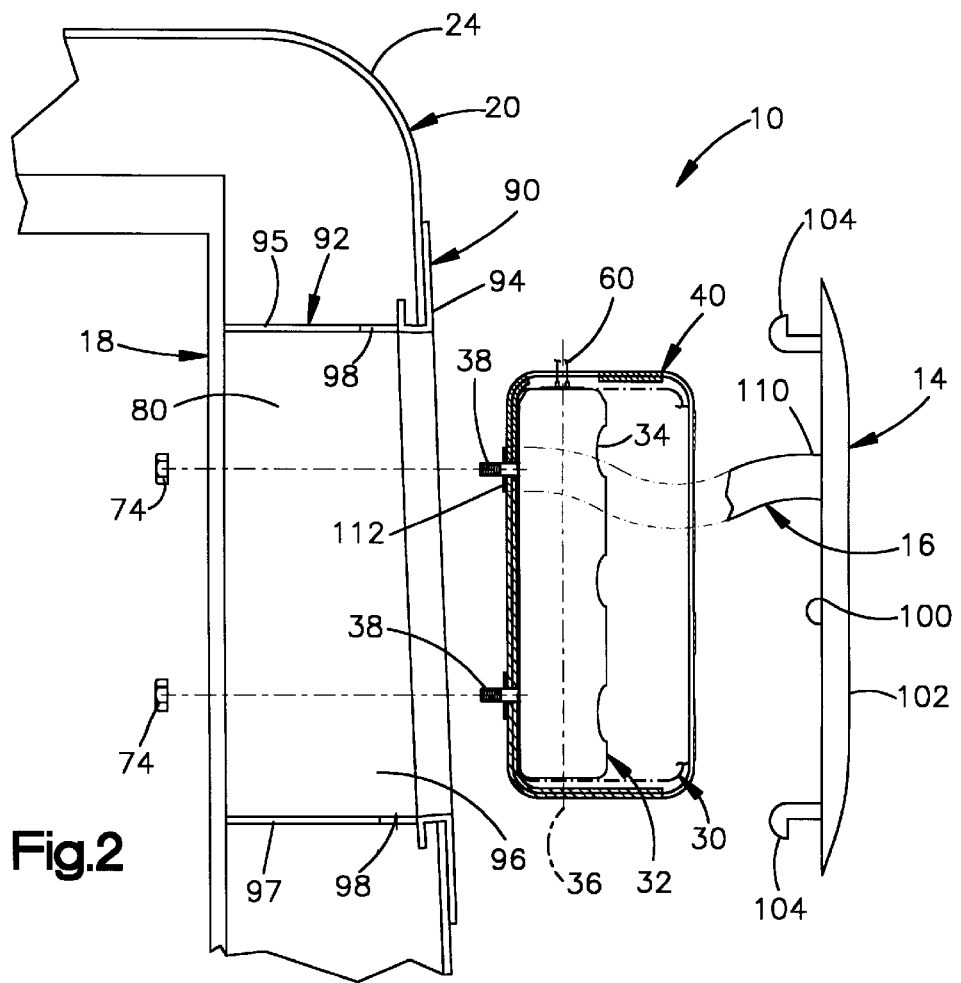
FIG. 2 is a longitudinal sectional view of the safety apparatus of FIG. 1, shown in a disassembled condition.
Figure 4:
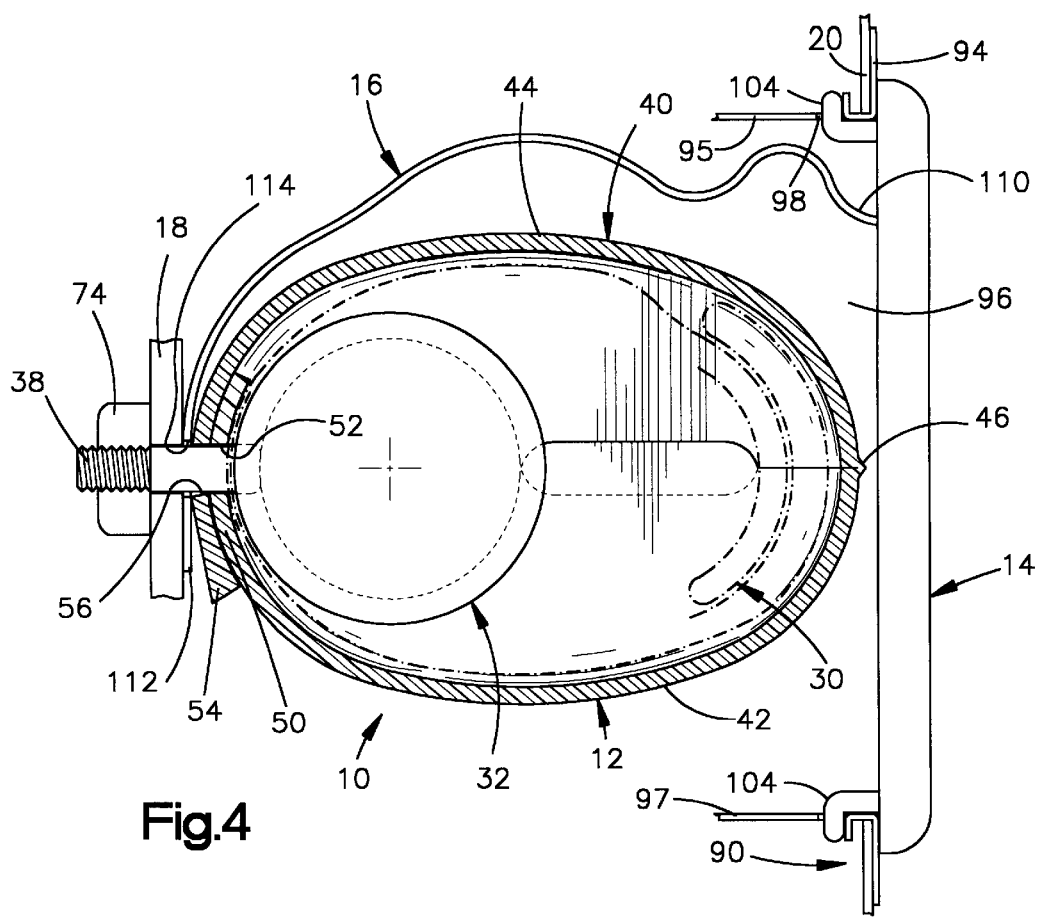
FIG. 4 is a transverse sectional view of the vehicle safety apparatus of FIG. 1.

The cover parts 42 and 44 are pivotable relative to each other, during assembly of the module 12, about the flexible joint or rupturable portion 46 between an open condition (not shown) and a closed condition as shown in FIGS. 2 and 4. As the cover parts 42 and 44 move relative to each other, the material of the flexible joint or rupturable portion 46 deforms or flexes.

In assembly of the air bag module 12, the inflator assembly 32 including the inflator and the diffuser is inserted into the air bag 30. The mounting bolts 38 project through openings in the air bag 30. The air bag 30 is folded in a known manner (not shown) so as to fit within the cover 40 when the cover is in the closed condition.

The cover 40 is then moved from an open condition (not shown) to the closed condition shown in FIGS. 2 and 4, to enclose the inflator assembly 32 and the air bag 30. During movement of the cover 40 from the open condition to the closed condition, the first and second cover parts 42 and 44 pivot relative to each other about the rupturable portion or flexible joint 46 of the cover.

When the cover 40 is in the closed condition shown in FIGS. 2 and 4, the flange portion 54 of the second part 44 of the cover overlies the flange portion 50 of the first part 42 of the cover. Lead wires 60 (FIG. 2) on the inflator assembly 32 extend out of the air bag 30 through another opening (not shown) in the air bag. The lead wires 60 are accessible through openings in an end wall of the cover 40.

The assembled air bag module 12 is rigidly affixed by the mounting bolts 38 to the seat frame member 18 in the seatback 24. A pair of nuts 74 are screwed onto the mounting bolts 38 to secure the module 12 to the seat frame member 18. The flange portion 54 of the second cover part 44 is clamped between the seat frame member 18 and the first cover part 42. The flared cross-sectional configuration of the flange portion 54 of the second cover part 44 acts to resist pull-out movement of the flange portion 54 (in an upward direction as viewed in FIG. 4) upon actuation of the inflator assembly 32.

The air bag module 12 is, preferably, mounted on the seatback 24 so that the air bag deploys in a generally forward and upward direction as illustrated in FIG. 1. The air bag module 12 when mounted in the seat 20 is enclosed by the soft seat covering material of the seat and, possibly, by foam cushion material of the seatback 24.

The module 12 is disposed in a cavity 80 in the seat 20. The safety apparatus 10 preferably includes a chute 90 (FIGS. 2–4) mounted on the soft outer portion of the seat back 24 spaced apart from the seat frame member 18. The chute 90 is a molded plastic member having a main body portion 92 which extends into the cavity 80 and which surrounds the module 12. The main body portion 92 includes upper and lower walls 95 and 97, respectively, of the chute 90. Tab locking openings 98 are formed in each of the walls 95 and 97.

An outer rim portion 94 of the chute 90 extends over the outside of the seat fabric to cover the edge of the seat back 24 defining the cavity 80. Because the chute 90 is not mounted on the seat frame member 18, the chute is movable relative to the module 12.

The chute 90 defines a deployment opening 96 in the seat 20. The deployment door 14 includes resilient or flexible locking tabs 104. The locking tabs 104 extend into the deployment opening 96 of the chute 90 and are received in the tab locking openings 98, behind the rim 94 of the chute. The locking tabs 104 releasably secure the deployment door 14 to the chute 90. The deployment door 14 can be secured to the chute 90 in other manners. For example, the chute 90 may have slots which receive tabs on the deployment door 14. Alternatively, the chute 90 may have tabs which are received in slots in a flange of the deployment door 14.

The deployment door 14 when mounted on the chute 90 closes the deployment opening 96. The deployment door 14 has opposite inner and outer side surfaces 100 and 102. The outer side surface 102 has a Class A finish to match the exterior material and finish of the seat 20. The deployment door 14, because it is mounted on the chute 90, is movable relative to the module 12.

The tether 16 is a flexible member which connects the deployment door 14 with the module 12. The tether 16 may be made from a fabric material, such as the nylon material of the air bag. A first end portion 110 of the tether 16 is connected with the deployment door 14 in a known manner (not shown) such as by insert molding. A second end portion 112 of the tether 16 has an opening 114 (FIG. 4). One of the mounting bolts 38 extends through the opening 114 in the second end portion 112 of the tether 16. The second end portion 112 of the tether 16 is thus secured to the seat frame member 18.

The vehicle in which the safety apparatus 10 is mounted includes known electrical means (not shown) for sensing a side impact to the vehicle and for actuating the inflator assembly 32 in response to the sensing of a side impact. The means may include a side impact sensor and vehicle circuitry for electrically actuating the inflator assembly 32 in response to sensing a side impact to the vehicle greater than a predetermined threshold value. The means is electrically connected with the inflator assembly 32, via the lead wires 60, for providing an actuation signal to the inflator assembly.

In the event of a side impact to the vehicle of a magnitude greater than the predetermined threshold value, the inflator assembly 32 is actuated by the electrical means. Inflation fluid flows out of the inflator assembly 32 through the fluid outlets 34 and into the air bag 30. The rapidly flowing inflation fluid causes the air bag 30 to inflate in the rearward direction 28, that is, to the right as viewed in FIGS. 1, 2 and 4.

The force of the inflating air bag 30 is applied against the inside of the cover 40. The cover 40 opens at the rupturable portion 46, which is the predetermined weakened portion of the cover. The first and second cover parts 42 and 44 pivot away from each other into an open condition. The interconnected flange portions 50 and 54 act as a hinge about which the first and second cover parts 42 and 44 pivot away from each other into the open condition.

As the air bag 30 continues to inflate, it contacts the inner side surface 100 of the deployment door 14. The force of the inflating air bag 30 causes the deployment door 14 to be pushed outward from and released from the chute 90, thereby uncovering the deployment opening 96. The air bag 30 inflates through the deployment opening 96 into a position to help protect the vehicle occupant. The tether 16 limits movement of the deployment door 14 away from the module 12 beyond a predetermined distance upon inflation of the air bag 30.

Because the deployment door 14 is not rigidly connected to the module 12 or the seat frame member 18, the deployment door is positionable on the vehicle seat 20 separately from the air bag module during assembly of the vehicle safety apparatus 10 into the seat. This can help to improve the fit between the deployment door 14 and the seat 20. This can also make the seat 20 more comfortable because the deployment door 14 can move or yield upon engagement by a vehicle occupant.

Figure 5:
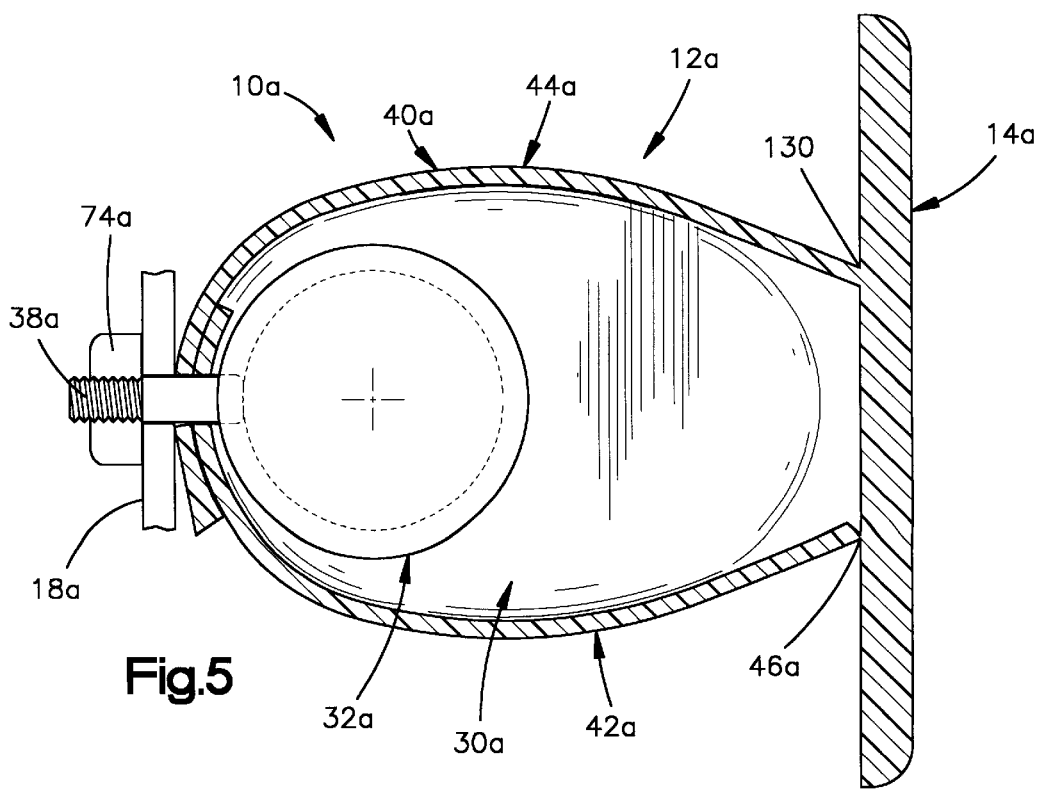
FIG. 5 is a view similar to FIG. 4 of a vehicle safety apparatus which is constructed in accordance with a second embodiment of the present invention.

FIG. 5 illustrates a vehicle safety apparatus 10a constructed in accordance with a second embodiment of the present invention. The safety apparatus 10a is generally similar in construction and operation to the safety apparatus 10 (FIGS. 1–4), and similar parts are given similar reference numerals with the suffix "a" added for clarity.

In the safety apparatus 10a, the deployment door 14a is molded as one piece with the cover 40a. Specifically, the deployment door 14a is permanently connected with the second cover part 44a at a connection location 130. The deployment door 14 is releasably connected with the first cover part 42a by a rupturable portion or tear seam 46a. The deployment door 14a is still movable relative to the seat frame member 18a, because of the flexibility of the first and second cover parts 42a and 44a.

Figure 6:
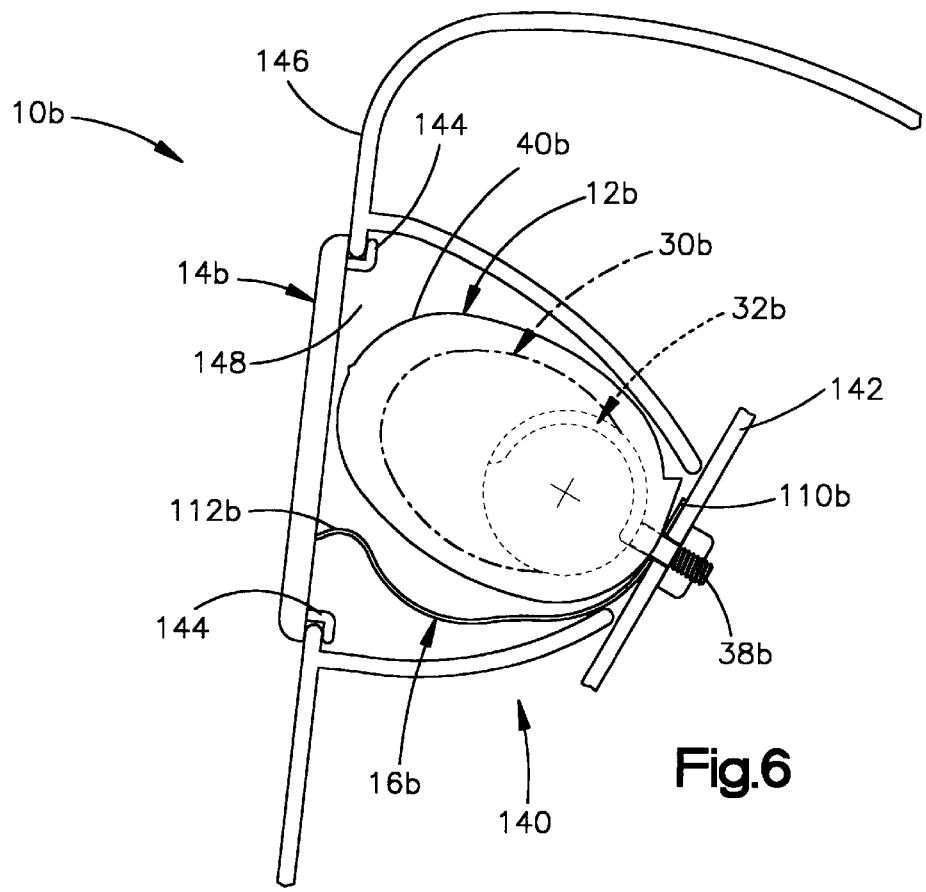
FIG. 6 is a schematic view of a vehicle safety apparatus which is constructed in accordance with a third embodiment of the present invention.

FIG. 6 is a schematic view of a vehicle safety apparatus 10b which is constructed in accordance with a third embodiment of the present invention. The vehicle safety apparatus 10b is mounted in an instrument panel 140 of a vehicle.

The safety apparatus 10b includes an air bag module 12b which is fixed by one or more mounting bolts 38b to a structural portion 142 of the vehicle instrument panel 140. The module 10b includes an inflator assembly 32b and an air bag 30b within a cover 40b. The safety apparatus 10b also includes a deployment door 14b. The deployment door 14b is releasably secured by mounting tabs 144 to an exposed trim portion 146 of the vehicle instrument panel 140, thereby covering a deployment opening 148 in the instrument panel. The deployment door 14b faces generally rearward in the vehicle, so the air bag module 12b is a "mid-mount" type of module.

The safety apparatus 10b includes a flexible tether 16b. A first end portion 110b of the tether 16b is secured by a mounting bolt 38b to the vehicle instrument panel 140. A second end portion 112b of the tether 16b is secured to the deployment door 14b.

Upon actuation of the inflator assembly 32b and inflation of the air bag 30b, the deployment door 14b is pushed out of engagement with the instrument panel 140 by the inflating air bag. The deployment door 14b moves generally rearward in the vehicle. The tether 16b limits movement of the deployment door 14b away from the module 12b beyond a predetermined distance upon inflation of the air bag 30b.

Because the deployment door 14b is not rigidly connected to the air bag module 12b or to the structural portion 142 of the instrument panel 140, the deployment door is positionable on the instrument panel separately from the module during assembly of the vehicle safety apparatus 10b into the instrument panel. This can help to improve the fit between the deployment door 14b and the instrument panel 140.

Figure 7:
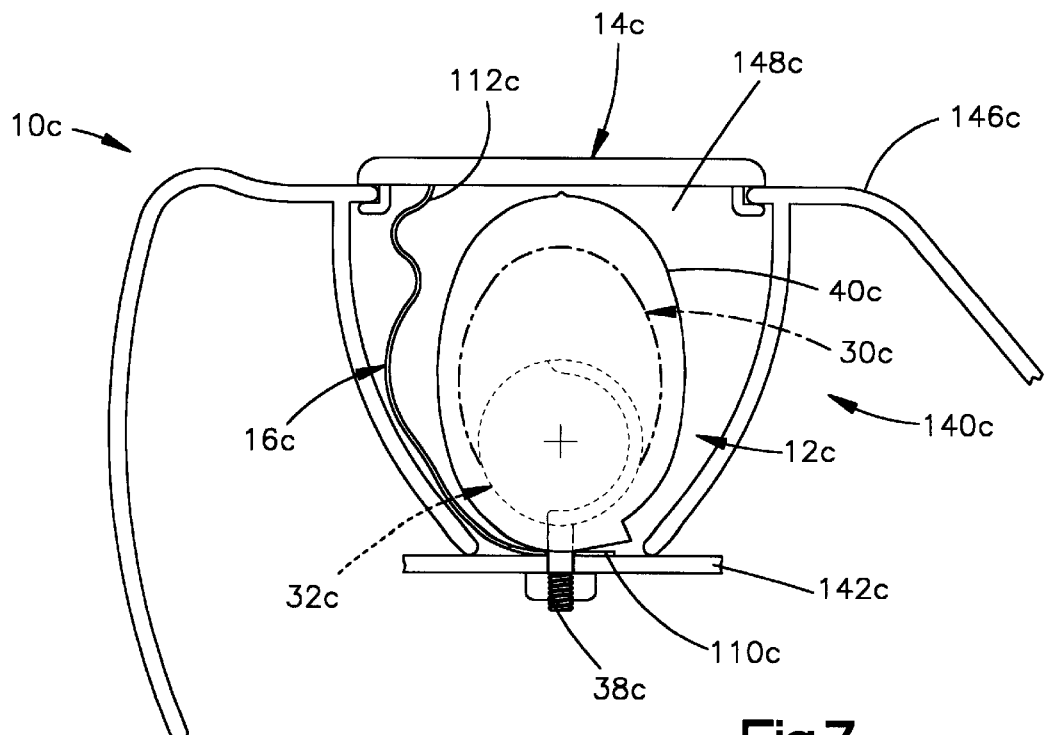
FIG. 7 is a schematic view similar to FIG. 6 of a vehicle safety apparatus which is constructed in accordance with a fourth embodiment of the present invention.

FIG. 7 is a schematic view similar to FIG. 6 of a vehicle safety apparatus 10c which is constructed in accordance with a fourth embodiment of the present invention. In the safety apparatus 10c, the deployment door 14c faces generally upward in the vehicle, so the air bag module 10c is a "top-mount" type of module.

Upon actuation of the inflator assembly 32c and inflation of the air bag 30c, the deployment door 14c is pushed out of engagement with the instrument panel 140c by the inflating air bag. The deployment door 14c moves generally upward in the vehicle. The tether 16c limits movement of the deployment door 14c away from the module 12b beyond a predetermined distance upon inflation of the air bag 30c. Because the deployment door 14c is not rigidly connected to the module 12c or to the structural portion 142c of the instrument panel 140c, the deployment door is positionable on the instrument panel separately from the module during assembly of the vehicle safety apparatus 10c into the instrument panel. This can help to improve the fit between the deployment door 14c and the instrument panel 140c.

From the above description of the invention, those skilled in the art will perceive improvements, changes and modifications in the invention. Such improvements, changes and modifications within the skill of the art are intended to be covered by the appended claims.

Having described the invention, we claim:

1. A vehicle occupant safety apparatus for mounting in a portion of a vehicle, said apparatus comprising:

a module including an inflatable vehicle occupant protection device, an inflation fluid source, a cover for said vehicle occupant protection device and said inflation fluid source, and means for mounting said module in the vehicle portion;

said vehicle occupant protection device being inflatable from a deflated condition to an inflated condition to help protect an occupant of a vehicle;

said inflation fluid source being actuatable to provide inflation fluid for inflating said protection device;

said module cover enclosing said inflation fluid source and said protection device when said protection device is in the deflated condition;

said module cover being made from a material which is flexible and wrapped around said vehicle occupant protection device and said inflation fluid source;

a deployment door;

means for releasably mounting said deployment door on the vehicle portion for movement relative to the vehicle portion upon inflation of said protection device; and a flexible member connecting said deployment door with said module for limiting movement of said deployment door away from said module beyond a predetermined distance upon inflation of said protection device, said means for mounting said module comprising a mounting member which projects through said flexible cover, said flexible member being connected to said mounting member and to said deployment door.

2. An apparatus as set forth in claim 1 wherein said mounting member is a bolt for securing said module in a seat of a vehicle.

3. An apparatus as set forth in claim 1 wherein said mounting member is a bolt for securing said module in an instrument panel of a vehicle.

4. An apparatus as set forth in claim 1 wherein said flexible member comprises a tether.

5. An apparatus as set forth in claim 4 wherein said tether is connected between said deployment door and said module.

6. An apparatus as set forth in claim 1 wherein said mounting means secures said module to a seat frame member of a seat of the vehicle, said deployment door being mounted to a soft outer portion of the seat spaced apart from the seat frame member.

7. An apparatus as set forth in claim 1 wherein said inflation fluid source comprises an inflator in a diffuser, said protection device being wrapped around said inflation fluid source and enclosed in said module cover.

8. An apparatus as set forth in claim 1 wherein said module cover is made from a material which is sufficiently flexible or deformable that said module is not perceived by an occupant of the vehicle as being a hard or rigid object when said module is mounted in the vehicle portion.

* * * * *